US007870508B1

United States Patent
Wright et al.

(10) Patent No.: US 7,870,508 B1
(45) Date of Patent: Jan. 11, 2011

(54) METHOD AND APPARATUS FOR CONTROLLING DISPLAY OF DATA ON A DISPLAY SCREEN

(75) Inventors: David G. Wright, San Diego, CA (US); Edward L. Grivna, Brooklyn Park, MN (US); Ronald H. Sartore, Poway, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 283 days.

(21) Appl. No.: 11/506,317

(22) Filed: Aug. 17, 2006

(51) Int. Cl.
*G06F 3/048* (2006.01)
(52) U.S. Cl. .................................................. 715/853
(58) Field of Classification Search ................ 715/853
See application file for complete search history.

(56) References Cited

U.S. PATENT DOCUMENTS

| 4,550,221 | A | 10/1985 | Mabusth |
| 6,278,443 | B1 | 8/2001 | Amro et al. |
| 6,904,570 | B2 | 6/2005 | Foote et al. |
| 6,958,749 | B1 | 10/2005 | Matsushita et al. |
| 7,479,949 | B2 | 1/2009 | Jobs et al. |
| 2002/0171682 | A1* | 11/2002 | Frank et al. ................ 345/790 |
| 2004/0237048 | A1* | 11/2004 | Tojo et al. ................... 715/745 |
| 2007/0079258 | A1* | 4/2007 | Hsieh et al. ................. 715/853 |
| 2008/0042986 | A1 | 2/2008 | Westerman et al. |
| 2008/0042987 | A1 | 2/2008 | Westerman et al. |
| 2008/0042988 | A1 | 2/2008 | Westerman et al. |
| 2008/0042989 | A1 | 2/2008 | Westerman et al. |
| 2008/0122796 | A1 | 5/2008 | Jobs et al. |
| 2008/0128182 | A1 | 6/2008 | Westerman et al. |

OTHER PUBLICATIONS

Microsoft Press, "Microsoft Windows User Experience Official Guidelines for User Interface Developers and Designers," 1999.*
Maricopa Center for Learning and Instruction, "Writing HTML: Lesson 25: Targeting Windows," 2002, http://www.mcli.dist.maricopa.edu/tut/tut25.html.*

* cited by examiner

*Primary Examiner*—William L Bashore
*Assistant Examiner*—Daniel Um

(57) ABSTRACT

In one embodiment, a method for controlling display of data includes identifying a data item selected by a user from multiple data items displayed on a display screen, and modifying the appearance of the multiple data items. The method further includes causing the multiple data items to be displayed on the display screen in the modified form, together with additional information pertaining to the selected data item, where the additional information is presented without obscuring the multiple data items displayed on the display screen.

15 Claims, 5 Drawing Sheets

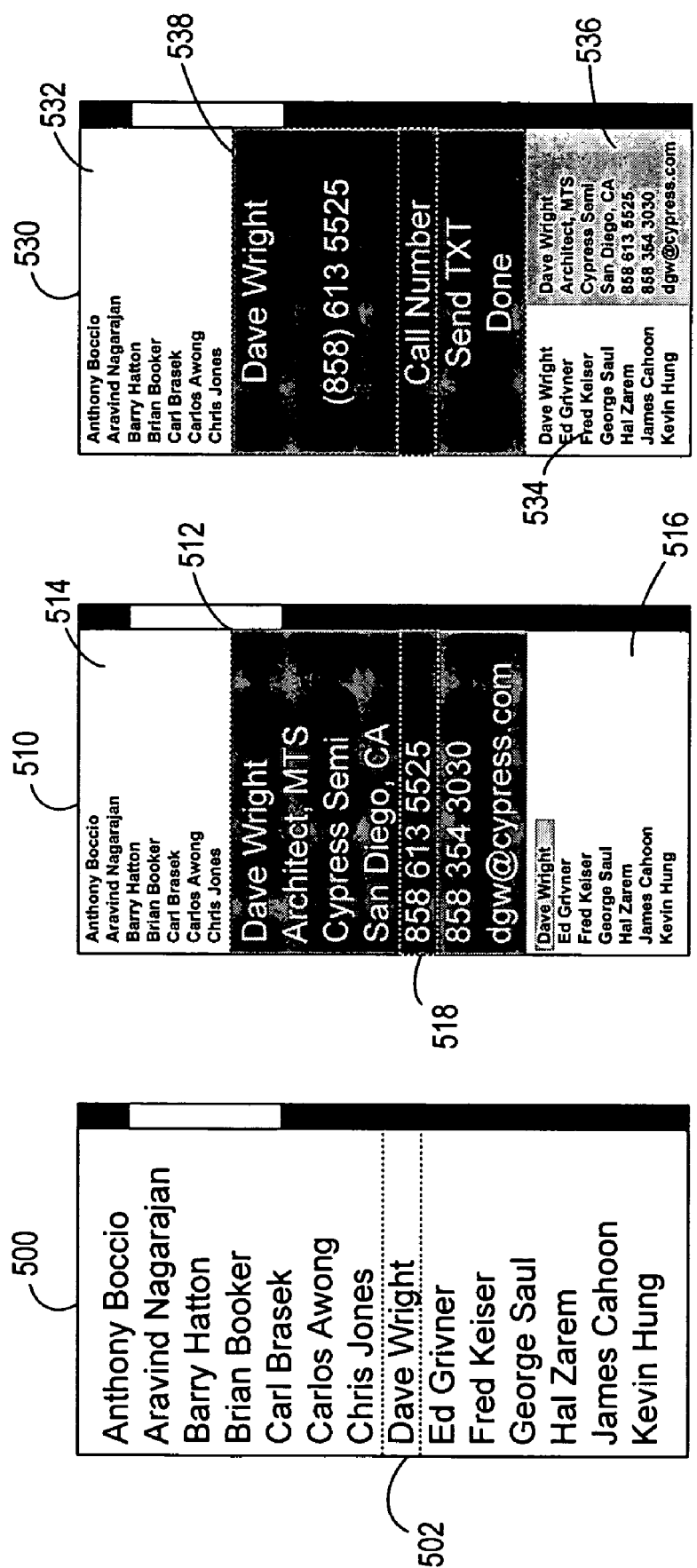

METHOD AND APPARATUS FOR CONTROLLING DISPLAY OF DATA ON A DISPLAY SCREEN

BACKGROUND

1. Field

Embodiments of the invention relate generally to data presentation and more specifically, but not exclusively, to controlling display of data on a display screen.

2. Background Information

Smart compact devices such as personal digital assistants (PDAs), cellular phones and portable music players are capable of storing and accessing large amounts of data. A user can store and retrieve information from a smart compact device by manipulating screen objects (e.g., scroll bars, drop-down lists, buttons, text windows, etc.) of a graphical user interface (GUI) with an activating object such as a finger or a pen.

The graphical user interface on a smart compact device is often derived from graphical user interfaces that are well known on desktop computers. A key difference between desktop computers and smart compact devices is that the display screen on a smart compact device is much smaller. The small size makes it difficult to present data stored in the smart compact device in an easy to use way.

One exemplary prior art technique for presenting data on a display screen of a smart compact device is illustrated in FIG. 1. This technique has been disclosed in the U.S. Pat. No. 6,904,570.

Referring to FIG. 1, a menu 100 lists contact names stored in a cellular phone address book. A user can scroll up or down through the list 100. When the user taps a desired contact name 102 with the activating object such as a pen or finger, a popup window 110 is displayed instead of or on top of the list 100. The user can then tap the dial icon 112 to initiate the dialing sequence.

However, the above technique results in a popup window obscuring some or all of the data displayed in the main window, preventing the navigation of the menu system at any level other than the currently selected hierarchical level.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 5A-5C illustrate the presentation of hierarchical menu data to a user.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

References throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate, communicate, or interact with each other.

Embodiments of the present invention provide an improved mechanism for displaying data on a display screen, which allows simple and easy access to large amounts of data.

Figure 1:
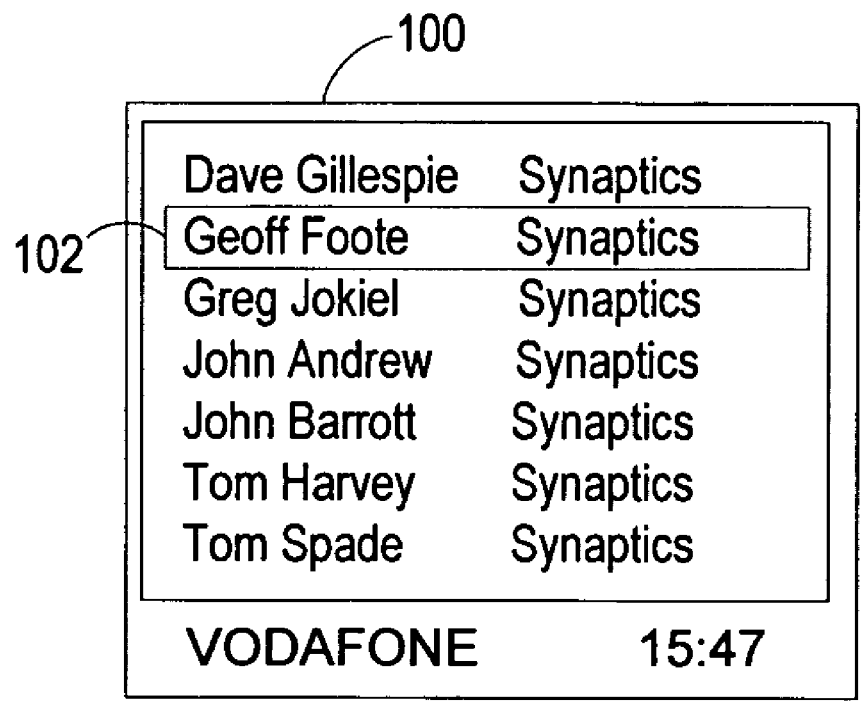
FIG. 1 illustrates a prior art technique of managing data on a display screen of a smart compact device.
Figure 1:
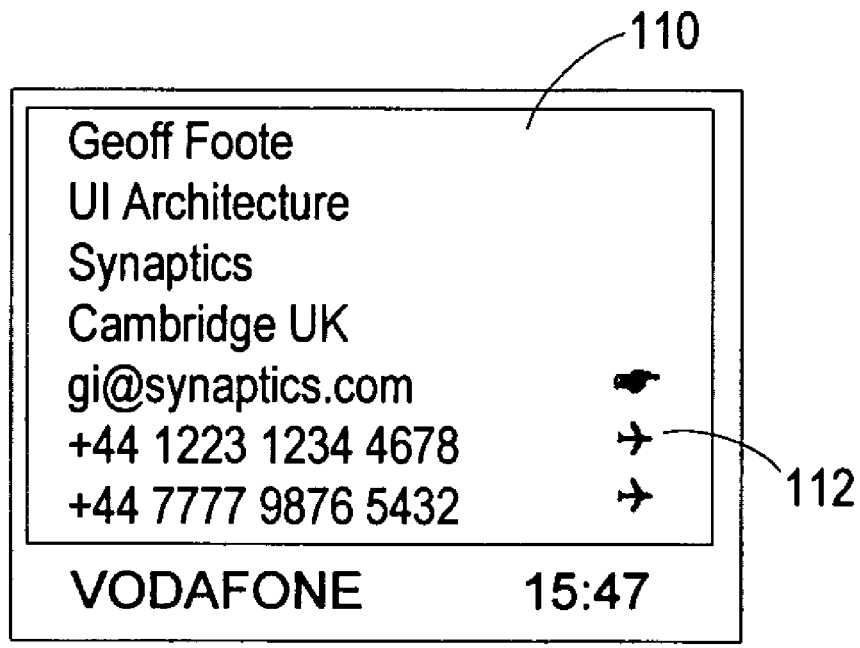
Figure 2:
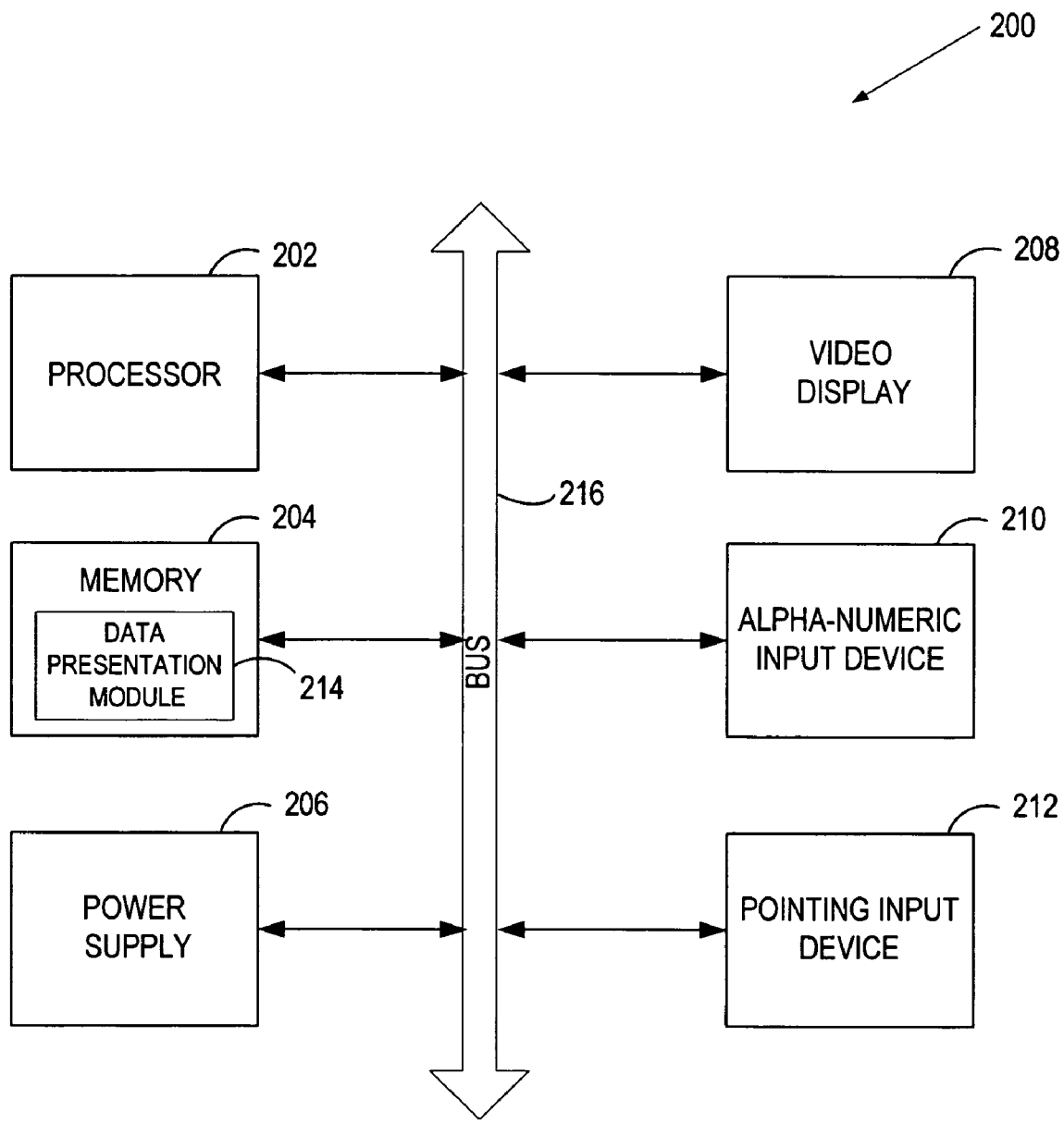
FIG. 2 is a block diagram of an exemplary computer system in which embodiments of the present invention may be implemented.

FIG. 2 is a block diagram of an exemplary computer system 200, in which embodiments of the present invention may be implemented. According to one embodiment, the computer system 200 is a mobile computing device such as a cellular phone, a PDA, an electronic book, a portable music player, a digital camera, etc.

The computer system 200 includes a processor 202 and a memory 204, which communicate with each other via a bus 216. The computer system 200 may further include a video display unit 208 (e.g., a liquid crystal display (LCD) or a cathode ray tube (CRT)). The computer system 200 also includes a power supply 206, an alpha-numeric input device 210 (e.g., a keyboard) and a pointing input device 212. The pointing input device 212 may be a touch screen configured to accept input from an activating object such as a finger, pen, stylus, and the like. In one embodiment, the pointing input device 212 can provide position data both when the activating object is touching the display screen (touching state) and when it is held in close proximity to, but not touching, the display screen (proximate non-touching state), and is able to distinguish between the two states. Alternatively, the pointing input device 212 may be a trackwheel (also known as a "thumbwheel" or a "jogwheel"), a scrolling wheel (with or without a "click" function) for facilitating menu navigation or selection of a desired object on the screen. It should be noted that various other pointing and/or navigation devices may be used with the computer system 200 without loss of generality In one embodiment, the memory 204 hosts a data presentation module 214 that is responsible for controlling display of data on the display device 208. In particular, the data presentation module 214 identifies a data item selected by a user from multiple data items displayed on the screen. In one embodiment, the data presentation module 214 identifies the selected data item based on data received from the pointing input device 212 (e.g., a touch screen pointing input device or a thumbwheel pointing input device). The data received from the pointing input device 212 such as a touch screen may include, for example, current X and Y position data and the state of the pointing input device (e.g., a base state corresponding to an activating object in close proximity to, but not touching a display screen, or a selected state corresponding to an activating object touching the display screen).

Once the data presentation module 214 identifies the selected data item, it causes the multiple data items to be displayed on the screen in a modified form, together with the selected item's detailed information that is presented without obscuring the multiple data items displayed on the screen.

In one embodiment, the data presentation module 214 controls display of data by reducing the size of the displayed characters of the multiple data items, and causing the detailed information to be displayed in a new window occupying a part of the screen while the multiple data items are displayed at a smaller size in the remaining part of the screen. In one embodiment, the data presentation module 214 reduces the size of the displayed characters by modifying a predefined font size parameter for displaying the multiple data items. Alternatively, if such a parameter is not provided, the data presentation module 214 creates a smaller font for displaying the multiple data items.

In another embodiment, the data presentation module 214 controls display of data by reducing the contrast for displaying the multiple data items, and causing the detailed information to be displayed in the foreground in a semi-transparent manner while the multiple data items are displayed in the background at a reduced contrast.

The data presentation module 214 includes a set of instructions embodying any one, or all, of the methodologies described above. These instructions, stored in a computer-readable medium, may also reside, completely or at least partially, within the processor 202. The instructions may further be transmitted or received by the computer system 200 via a network. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, and optical and magnetic disks.

Figure 3:
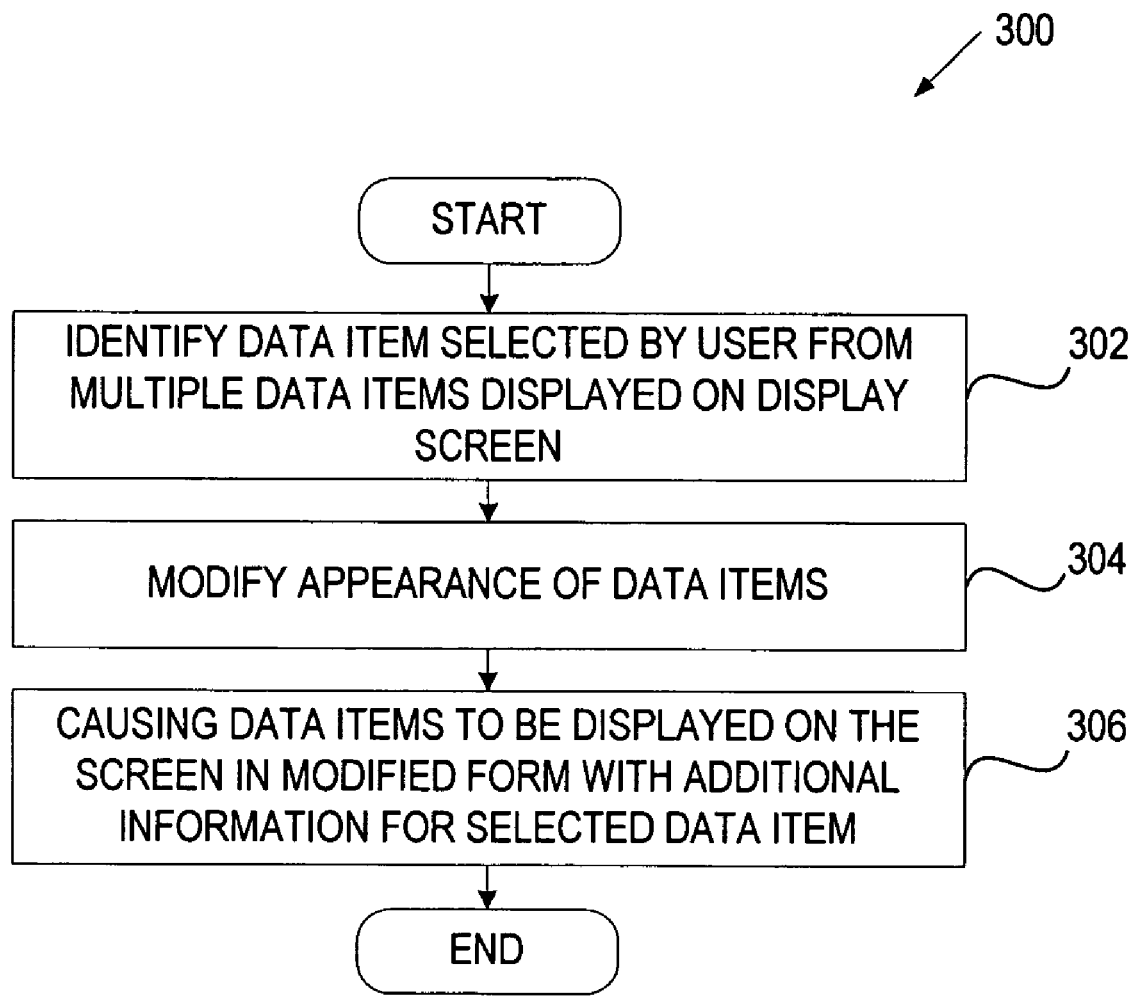
FIG. 3 is a flow diagram of one embodiment of a method for controlling display of data on a display screen.

FIG. 3 is a flow diagram of one embodiment of a method 300 for controlling display of data on a display screen. The method 300 may be performed by processing logic of the data presentation module 214. Processing logic may comprise hardware (e.g., circuitry, dedicated logic, programmable logic, or microcode), software (such as that run on a general purpose computer system or a dedicated machine), or a combination of both.

Referring to FIG. 3, method 300 begins with processing logic identifying a data item selected by a user from multiple data items displayed on a display screen (block 302). In one embodiment, processing logic identifies the selected data item based on data received from a pointing input device. For example, the pointing input device may be a touch screen that accepts input from an activating object (e.g., pen or finger) used by the user to manipulate objects on the screen of a smart compact device. Alternatively, the pointing input device may be a thumbwheel or any other pointing input device and/or navigation device facilitating a user selection of a data item on the screen.

In one embodiment, the multiple data items are presented as a menu, with each menu item having detailed information that becomes visible when a relevant menu item is selected.

At block 304, processing logic modifies the appearance of the displayed data items. In one embodiment, processing logic modifies the appearance by decreasing the size of the displayed data items. In another embodiment, processing logic modifies the appearance by reducing the contrast for displaying the data items.

At block 306, processing logic causes the data items to be displayed on the screen in the modified form, together with additional information pertaining to the selected data item, where the additional information is displayed without obscuring the data items. In one embodiment, the additional information is displayed in a new window occupying a part of the screen, and the data items are displayed at a reduced size in the remaining portion of the screen. Because of their reduced size, the data items occupy less space on the screen, allowing for unobstructed displayed of both top-level data and lower-level data. Exemplary UIs illustrating this data presentation will be discussed in more detail below in conjunction with FIGS. 5A-5C.

In an alternative embodiment, the additional information is displayed in the foreground in a semi-transparent manner, and the data items are displayed in the background at a reduced contrast. In this way, the detailed information is visible over the top of the higher-level data, which is also readable behind the detailed information displayed in a semi-transparent manner.

Figure 4:
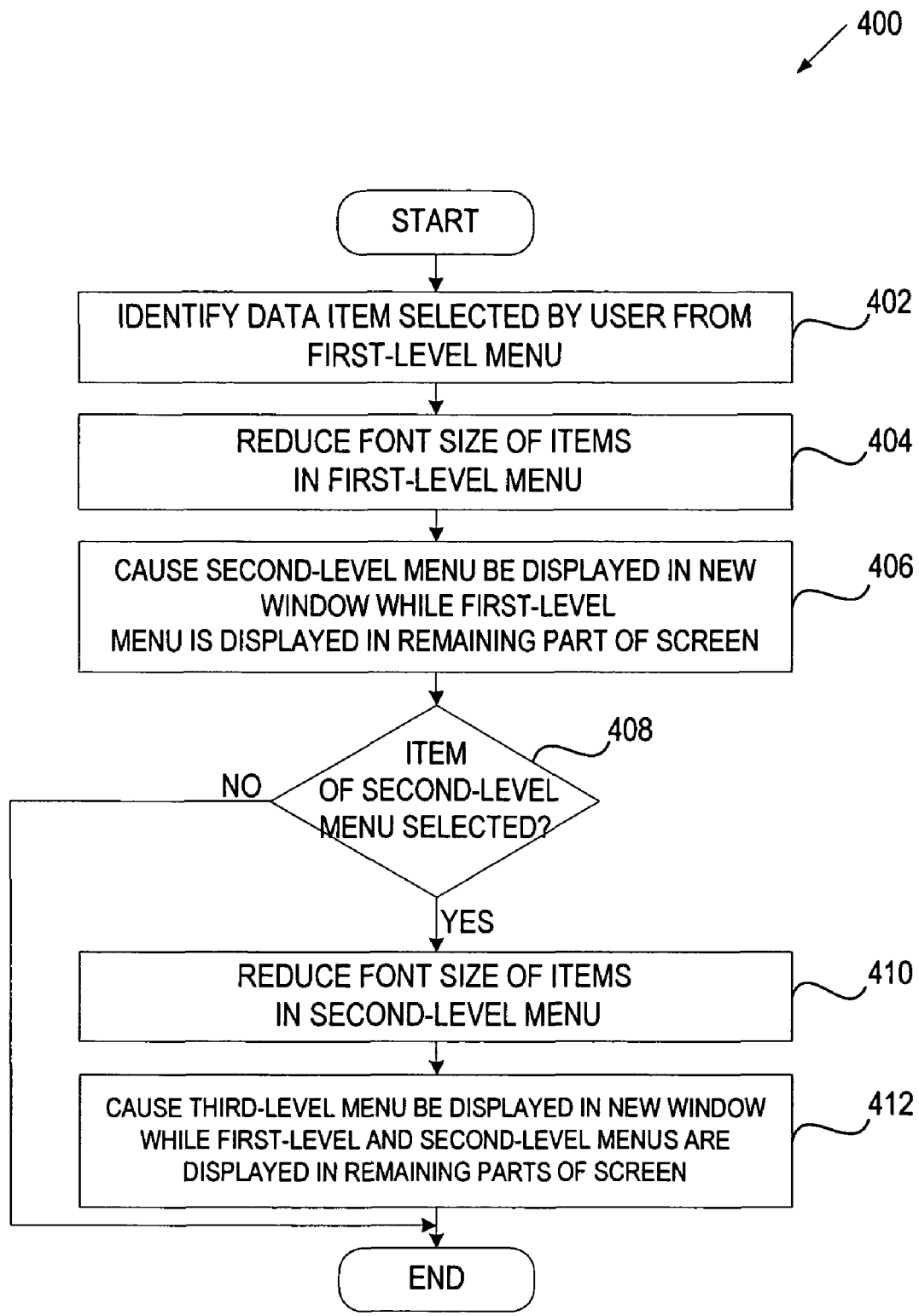
FIG. 4 is a flow diagram of one embodiment of a method for facilitating the navigation through hierarchical menu data.

FIG. 4 is a flow diagram of one embodiment of a method 400 for facilitating the navigation through hierarchical menu data. The method 400 may be performed by processing logic of the data presentation module 214. Processing logic may comprise hardware (e.g., circuitry, dedicated logic, programmable logic, or microcode), software (such as run on a general purpose computer system or a dedicated machine), or a combination of both.

Referring to FIG. 4, method 400 begins with processing logic identifying a data item selected by a user from a first-level menu displayed on a display screen of a smart compact device (block 402). The first-level menu may include, for example, a list of contact names from a user address book stored in the smart compact device. As discussed above, processing logic may identify the selected data item using current position data and the state of the pointing input device, or any other information provided by the pointing input device.

At block 404, processing logic reduces the size of the displayed first-level menu. In one embodiment, processing logic reduces the size of the displayed first-level menu by changing a designated font parameter of the first-level menu. Alternatively, processing logic creates a new font for the first-level menu.

At block 406, processing logic causes a second-level menu to be displayed for the selected data item in a new window while the items of the first-level menu are displayed at a reduced size in the remaining portion of the screen. The second-level menu may include, for example, a list of data items describing various details of contact information for a person selected from the first-level menu.

At block 408, processing logic determines whether any item of the second-level menu has been selected. If not, method 400 ends. If so, processing logic reduces the size of the second-level menu (block 410), and at block 412 causes a third-level menu to be displayed in a new window while the first-level menu and the second level menu are displayed at a reduced size in the remaining portions of the screen. An item selected from the second-level menu may, for example, be a phone number, and the third-level menu may list actions such as dial or send a text message.

Method 400 may continue iteratively, with multiple higher-level menu data being displayed at a reduced size in different portions of the screen.

FIGS. 5A-5C illustrate the presentation of hierarchical menu data to a user.

Referring to FIG. 5A, a top-level menu 500 is initially displayed. Menu 500 includes a list of contact names from a user's address book. A user can choose a menu item by tapping on it with an activating object or holding the activating object over this item for a certain time. Alternatively, the user can choose the menu item by navigating to it and selecting it using the thumbwheel.

When the user selects a menu item 502, detailed information about that menu item is displayed as illustrated in FIG. 5B.

Referring to FIG. 5B, screen 510 displays the detailed information in a new window 512 occupying a part of the screen 510, while the higher-level menu information is displayed at a smaller size in the remaining parts 514 and 516 of the screen 510. When the user selects a menu item 518, new information for this menu item is displayed as illustrated in FIG. 5C.

Referring to FIG. 5C, screen 530 displays the new information in a new window 538 occupying a part of the screen 530, while the higher-level menu information is displayed at a smaller size in the remaining parts 532, 534 and 536 of the screen 530.

As the example shows, this process may continue iteratively, with multiple higher-level menu data being displayed at a reduced size in different portions of the screen.

In one embodiment, as the user scrolls through the higher-level menu (e.g., the contact names), processing logic simultaneously displays lower-level menu data (e.g., full contact details) for the scrolled higher-level menu items.

Accordingly, higher-level menu data can be viewed simultaneously with lower level menu details, allowing for more information to be displayed on the screen. In addition, easy navigation of hierarchical menus is provided, without always having to return to exclusively displaying higher-level menus in order to navigate at a higher menu level.

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method, comprising:
identifying a first data item selected by a user from a first plurality of data items displayed in a higher-level menu on a display screen;
modifying, by a data processing system, an appearance of the first plurality of data items in response to identifying the data item selected by the user, wherein the modifying comprises decreasing a size of the first plurality of data items in the higher-level menu;
causing the first plurality of data items to remain displayed on the display screen in a modified form, together with a first set of additional information in a first lower-level menu pertaining to the selected data item,
identifying a second data item selected by a user from a second plurality of data items displayed as part of the first set of additional information in the first lower-level menu on a display screen;
modifying, by a data processing system, an appearance of the second plurality of data items displayed as part of the first set of additional information in response to identifying the data item selected by the user; and
causing the first set of additional information to remain displayed on the display screen in a modified form, together with a second set of additional information in a second lower-level menu pertaining to the selected data item,
wherein the first and second sets of additional information are presented without obscuring the first plurality of data items displayed on the display screen.

2. The method of claim 1 wherein identifying the first and second data items selected by the user comprises:
determining that a state of an activating object held above the data item has changed to a touching state.

3. The method of claim 1 further comprising:
detecting a user scrolling through the higher level menu; and
simultaneously displaying first and second lower level menu data for corresponding items of the higher level menu.

4. The method of claim 1 wherein displaying, on the display screen, the first and second pluralities of data items in a modified form and additional information pertaining to the selected data item comprises:
displaying the first set of additional information in a first window occupying a first part of the display screen;
displaying the second set of additional information in a second window occupying a second part of the display screen; and
displaying the first and second pluralities of data items at the decreased size in a remaining portion of the display screen.

5. The method of claim 4 further comprising:
detecting a user selection of an item within the first or second set of additional information;
decreasing a size of the additional information;
displaying details for the selected additional information item in a second window occupying a second part of the display screen; and
displaying the plurality of data items and the additional information at the decreased size in remaining portions of the display screen.

6. The method of claim 1 wherein modifying the appearance of the first and second pluralities of data items comprises:
reducing contrast for displaying the first and second pluralities of data items.

7. The method of claim 6 wherein displaying, on the display screen, the first and second pluralities of data items in a modified form and first and second sets of additional information pertaining to the first and second selected data items comprises:

displaying the first and second pluralities of data items on the display screen at the reduced contrast; and displaying the first and second sets of additional information in a foreground in a semi-transparent manner.

8. An article of manufacture comprising:

a computer-readable storage medium including a plurality of instructions which when executed perform a method comprising:

identifying a first data item selected by a user from a first plurality of data items displayed in a higher-level menu on a display screen;

modifying an appearance of the first plurality of data items in response to identifying the data item selected by the user, wherein the modifying comprises decreasing a size of the first plurality of data items in the higher-level menu;

causing the first plurality of data items to remain displayed on the display screen in a modified form, together with a first set of additional information displayed in a first lower-level menu pertaining to the selected data item, identifying a second data item selected by a user from a second plurality of data items displayed as part of the first set of additional information in the first lower-level menu on a display screen;

modifying, by a data processing system, an appearance of the second plurality of data items displayed as part of the first set of additional information in response to identifying the data item selected by the user; and causing the first set of additional information to remain displayed on the display screen in a modified form, together with a second set of additional information in a second lower-level menu pertaining to the selected data item, wherein the first and second sets of additional information are presented without obscuring the first or second pluralities of data items displayed on the display screen.

9. The article of manufacture of claim 8 wherein the method further comprises:

detecting a user scrolling through the higher level menu; and simultaneously displaying lower level menu data for corresponding items of the higher level menu.

10. The article of manufacture of claim 8 wherein displaying, on the display screen, the first and second pluralities of data items in a modified form and the first and second sets of additional information pertaining to the first and second selected data items comprises:

displaying the first and second sets of additional information in a first and second window occupying a first and second part of the display screen; and displaying the first and second pluralities of data items at the decreased size in a remaining portion of the display screen.

11. The article of manufacture of claim 8 wherein modifying the appearance of the first and second pluralities of data items comprises:

reducing contrast for displaying the first and second pluralities of data items.

12. An apparatus comprising:

a display device to display a first plurality of data items in a higher-level menu on a display screen and a second plurality of data items in a lower-level menu on the display screen; and a data presentation module to identify a first data item selected by a user from the first plurality of data items, to modify an appearance of the first plurality of data items in response to identifying the first data item selected by the user, to cause the first plurality of data items in the higher-level menu to remain displayed on the display screen in a modified form, together with first set of additional information displayed in a first lower-level menu pertaining to the selected data item, and to modify the appearance of the first plurality of data items by decreasing a size of the first plurality of data items in the higher-level menu, to identify a second data item selected by a user from the second plurality of data items, to modify an appearance of the second plurality of data items in response to identifying the second data item selected by the user, to cause the second plurality of data items in the first lower level menu to remain displayed on the display screen in a modified form, together with first set of additional information displayed in a second lower level menu pertaining to the selected data item, and to modify the appearance of the second plurality of data items by decreasing a size of the second plurality of data items in the first lower level menu, wherein the first and second sets of additional information is presented without obscuring the plurality of data items displayed on the display screen.

13. The apparatus of claim 12 wherein the data presentation module is to detect a user scrolling through the higher level menu, and to simultaneously display first and second lower level menu data for corresponding items of the higher level menu and the first lower level menu.

14. The apparatus of claim 12 wherein the data presentation module is to cause the first and second sets of additional information to be displayed in a first and second window occupying a first and second part of the display screen, and the first and second pluralities of data items to be displayed at the decreased size in a remaining portion of the display screen.

15. The apparatus of claim 12 wherein the data presentation module is to modify appearance of the first and second pluralities of data items by reducing contrast for displaying the first and second pluralities of data items.

\* \* \* \* \*